(12) United States Patent
Inglis et al.

(10) Patent No.: US 12,523,118 B2
(45) Date of Patent: Jan. 13, 2026

(54) GAS TIGHT BALL SEAT SYSTEM

(71) Applicant: Halliburton Energy Services, Inc., Houston, TX (US)

(72) Inventors: Peter D W Inglis, Arbroath (GB); David John O'Sullivan, Arbroath (GB)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/652,387

(22) Filed: May 1, 2024

(65) Prior Publication Data
US 2025/0341147 A1 Nov. 6, 2025

(51) Int. Cl.
*E21B 34/08* (2006.01)

(52) U.S. Cl.
CPC .......... *E21B 34/08* (2013.01); *E21B 2200/04* (2020.05)

(58) Field of Classification Search
CPC .............................. E21B 34/08; E21B 2200/04
See application file for complete search history.

(56) References Cited

U.S. PATENT DOCUMENTS

| | | | |
|---|---|---|---|
| 4,262,688 A | 4/1981 | Bialkowski | |
| 4,911,408 A | 3/1990 | Kemp | |
| 5,322,261 A | 6/1994 | Aarnes | |
| 5,338,003 A * | 8/1994 | Beson | F16K 3/205 251/174 |
| 7,758,016 B2 * | 7/2010 | Scott | F16K 5/0673 251/192 |
| 9,869,162 B2 * | 1/2018 | Inglis | F16K 5/201 |
| 10,030,784 B2 * | 7/2018 | Lanning | F16K 27/067 |
| 10,228,065 B2 * | 3/2019 | Gaburri | F16K 5/205 |
| 2012/0211690 A1 | 8/2012 | Anderson et al. | |
| 2016/0003004 A1 * | 1/2016 | Inglis | E21B 34/14 166/373 |
| 2016/0186870 A1 | 6/2016 | Ricard et al. | |
| 2023/0003100 A1 | 1/2023 | Manett et al. | |

FOREIGN PATENT DOCUMENTS

WO 2013183880 12/2013

OTHER PUBLICATIONS

International Search Report and Written Opinion for International Patent Application No. PCT/US2024/030330 dated Jan. 24, 2024. PDF file. 9 pages.

* cited by examiner

*Primary Examiner* — Matthew R Buck
(74) *Attorney, Agent, or Firm* — Scott Richardson; C. Tumey Law Group PLLC

(57) ABSTRACT

The embodiments herein provide a ball valve assembly comprising a ball with an external piston that is biased against the ball to create an external seat at a surface of the ball on the down hole side of the ball as well as an internal piston that is biased against the ball to create an internal seat at a surface of the ball also on the down hole side of the ball. Some embodiments also provide an external gasket that seals between the external piston and the internal piston and an internal gasket that seals between the internal piston and a stationary body. Some embodiments also provide an external spring positioned between the internal piston and the external piston and an internal spring positioned between a stationary body and the internal piston. In some embodiments, the external spring force is the only force acting on the external piston when the valve is sealing off downhole fluid.

20 Claims, 6 Drawing Sheets

GAS TIGHT BALL SEAT SYSTEM

BACKGROUND

Valves are used in many different industries to mechanically control the flow of fluids. It is important that a valve can accurately control fluids, even at high pressures and temperatures, for the longest possible useful lifetime. In the specific field of subterranean well drilling and production, the downhole fluids can often be a mixture of both liquids and gases, where the down hole gases are particularly difficult to seal using a metal-to-metal ball valve. Applying large forces to the ball has found to create deformations where large deformations have been found to create fluid leaks.

BRIEF DESCRIPTION OF THE DRAWINGS

These drawings illustrate certain aspects of some of the embodiments of the present disclosure and should not be used to limit or define the method.

DETAILED DESCRIPTION

Figure 1:
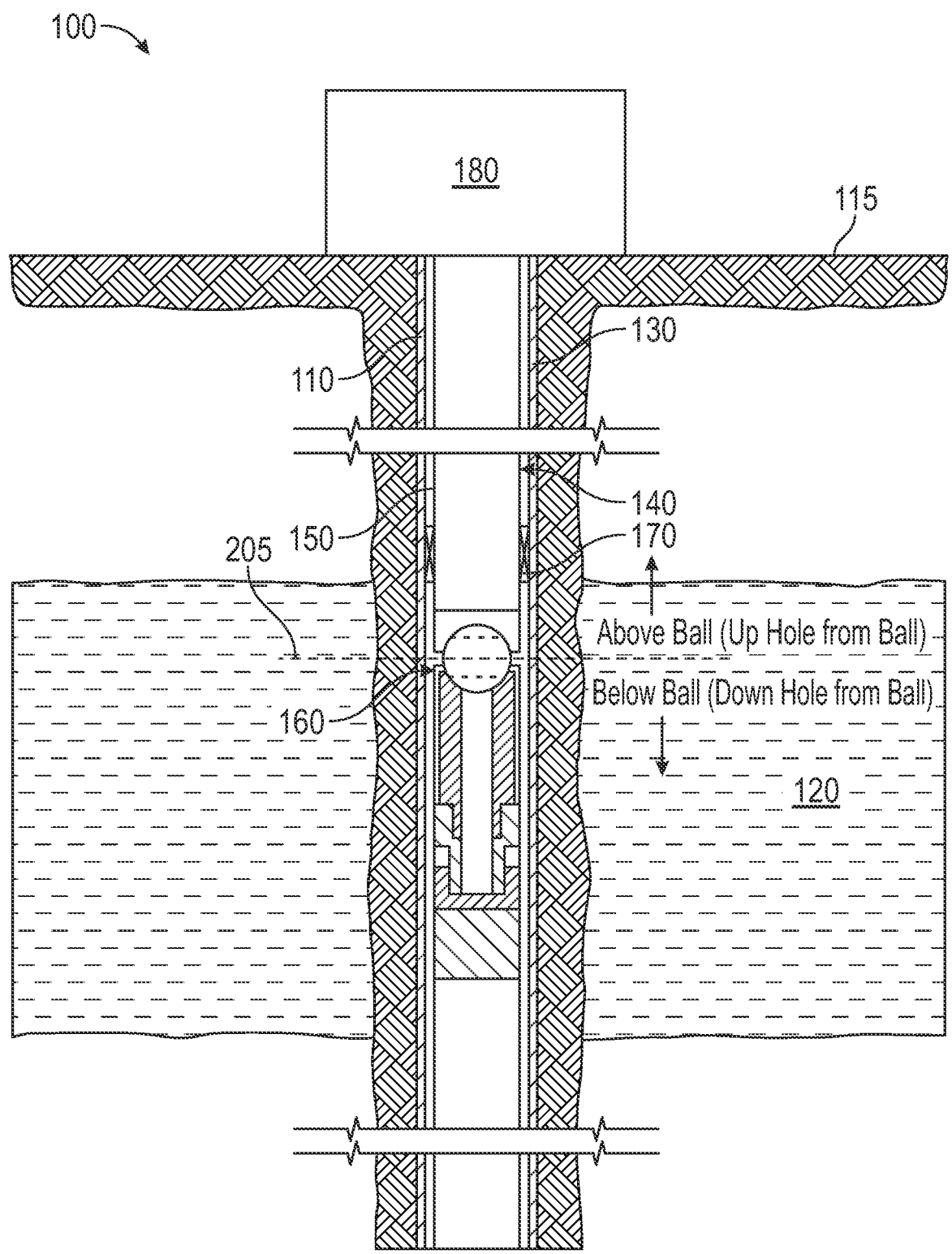
FIG. 1 illustrates a side section view of a well system that may employ the principles of the present disclosure within a downhole valve assembly.

Disclosed herein are embodiments of a ball valve assembly having a ball; an external piston that is biased against the ball to create an external seat on a down hole side of the ball; an internal piston that is biased against the ball to create an internal seat on a down hole side of the ball; an external gasket that seals between the external piston and the internal piston; and an internal gasket that seals between the internal piston and a stationary body.

Further embodiments disclose where the internal piston is biased with a spring having at least twice the spring force as a spring used to bias the external piston. Further embodiments disclose where the biasing of the external piston is done by a spring that is positioned between the external piston and the internal piston. Further embodiments disclose where the internal seat is closer to a central axis of the valve assembly than the external seat. Further embodiments disclose where the biasing of the internal piston is done by a spring that is positioned between the internal piston and a stationary body. Further embodiments disclose where the external piston moves relative to the internal piston.

Disclosed herein are embodiments of a ball valve assembly having a ball having a surface and a central axis; an external piston which contacts the surface of the ball to create an external seat; an internal piston which contacts the surface of the ball to create an internal seat; an external spring positioned between the internal piston and the external piston; and an internal spring positioned between a stationary body and the internal piston. Further embodiments disclose where the internal piston is positioned between the external piston and the central axis.

Further embodiments disclose where the internal seat is positioned between the external seat and the central axis. Further embodiments disclose an external gasket positioned between the external spring and the external seat. Further embodiments disclose where when sealing off downhole fluid pressure the downhole fluids contact an internal side of the internal piston. Further embodiments disclose where when sealing off above hole fluid pressure the above hole fluids contact an external side of the internal piston. Further embodiments disclose an external gasket that seals between the external piston and the internal piston; and an internal gasket that seals between the internal piston and a stationary body. Further embodiments disclose where the external gasket has a greater sealing diameter than the internal gasket.

Disclosed herein are embodiments of a ball valve assembly having a ball having a surface and a central axis; an internal piston which contacts the surface of the ball to create an internal seat, where the internal piston is located between the ball and a stationary body; an external piston which contacts the surface of the ball to create an external seat; an external spring positioned between the internal piston and the external piston; an internal spring positioned between the stationary body and the internal piston; and an internal gasket that seals between the internal piston and the stationary body.

Further embodiments disclose a first flat surface on the external piston; a second flat surface on the internal piston which faces the first flat surface; and wherein the external spring is located between the first flat surface and the second flat surface. Further embodiments disclose where a third flat surface on the internal piston; a fourth flat surface on the stationary body which faces the third flat surface; and wherein the internal spring is located between the third flat surface and the fourth flat surface. Further embodiments disclose where wherein the external spring force is the only mechanical force acting on the external piston when the valve is sealing off downhole fluid. Further embodiments disclose where downhole fluid does not contact the external piston when the valve is sealing off downhole fluid.

110 wellbore
115 terranean surface
120 subterranean formation
150 wellbore tubing
160 gas tight ball valve assembly
170 isolation packer
200 central axis of wellbore
205 horizontal central axis of ball
210 downhole fluid flow
220 traditional ball valve
225 spring
230 piston
240 traditional seat
250 ball
260 central bore
300 external pisto
310 external spring
320 external gasket
330 external seat
350 internal piston
360 internal spring
370 internal gasket
380 internal seat
390 stationary body
400 above hole fluid pressure 410 external spring force
420 internal spring force
430 downhole fluid pressure Some of the embodiments herein provide two seats within a single ball valve where the internal seat can be considered the main seat where it is designed to be the primary feature that seals pressure from below (downhole pressure) hopefully to where the seal is gas tight from below. The external seat may be considered the secondary seat and is designed to seal the pressure from above (above hole pressure). The external seat is preferably located on the outside of the internal seat on the downhole side of the ball (away from the central axis of the wellbore). Downhole pressure should act only on the internal seat (which should also be on the downhole side of the ball) and acts to push the internal seat onto the ball by a piston area defined by an area on the internal side of the internal piston measured from the metal-to-metal contact at the internal seat and ending at a seal with a stationary body. The internal seat is also held in contact with the ball by a spring which can provide a pre-load to the internal seat to help effect a low pressure seal. In some prior designs, the pressure below the ball acts on both seats such that the load applied to the ball from the two seats is overly large compared to that needed to effect a seal. This excessive load has been discovered to result in excessive deformation to the ball resulting in difficulty in obtaining a gas tight seal. In this design the external seat is isolated from the downhole pressure which allows the sealing load applied to the ball to be kept to a minimum (preferably only from the internal seat) so that ball deformation can be kept to a minimum and obtain a gas tight seal.

The external seat may be located on a shoulder of the outer diameter (OD) of the internal seat and may be pre-loaded onto the OD of the ball with a spring. Above hole pressure may act on the piston area of the external seat between the metal-to-metal seal and the seal between the external and internal seats pushing the external seat onto the ball. The above hole pressure may also act to push the internal seat down a (small) amount, but it has been discovered that this amount of movement may be acceptable as most debris will come from above hole locations and not downhole locations so it is unlikely that this minor deformation will cause debris to enter the sealing surface between the ball and the seats. In some embodiments, the system would bias the piston effect of the above ball pressure on the internal seat to also push the internal seat slightly onto the ball rather than away from the ball.

FIG. 1 illustrates a side section view of a well system 100 that may employ the principles of the present disclosure within a downhole gastight valve assembly 160. A wellbore 110 may extend downwardly from the well head 180 and into a subterranean formation 120. An exemplary ball valve assembly 160 may be located downhole, typically below an isolation packer 170. Wellbore tubing 150 may be ran within the wellbore 110 between the well head 180 and the isolation packer 170.

Figure 2A:
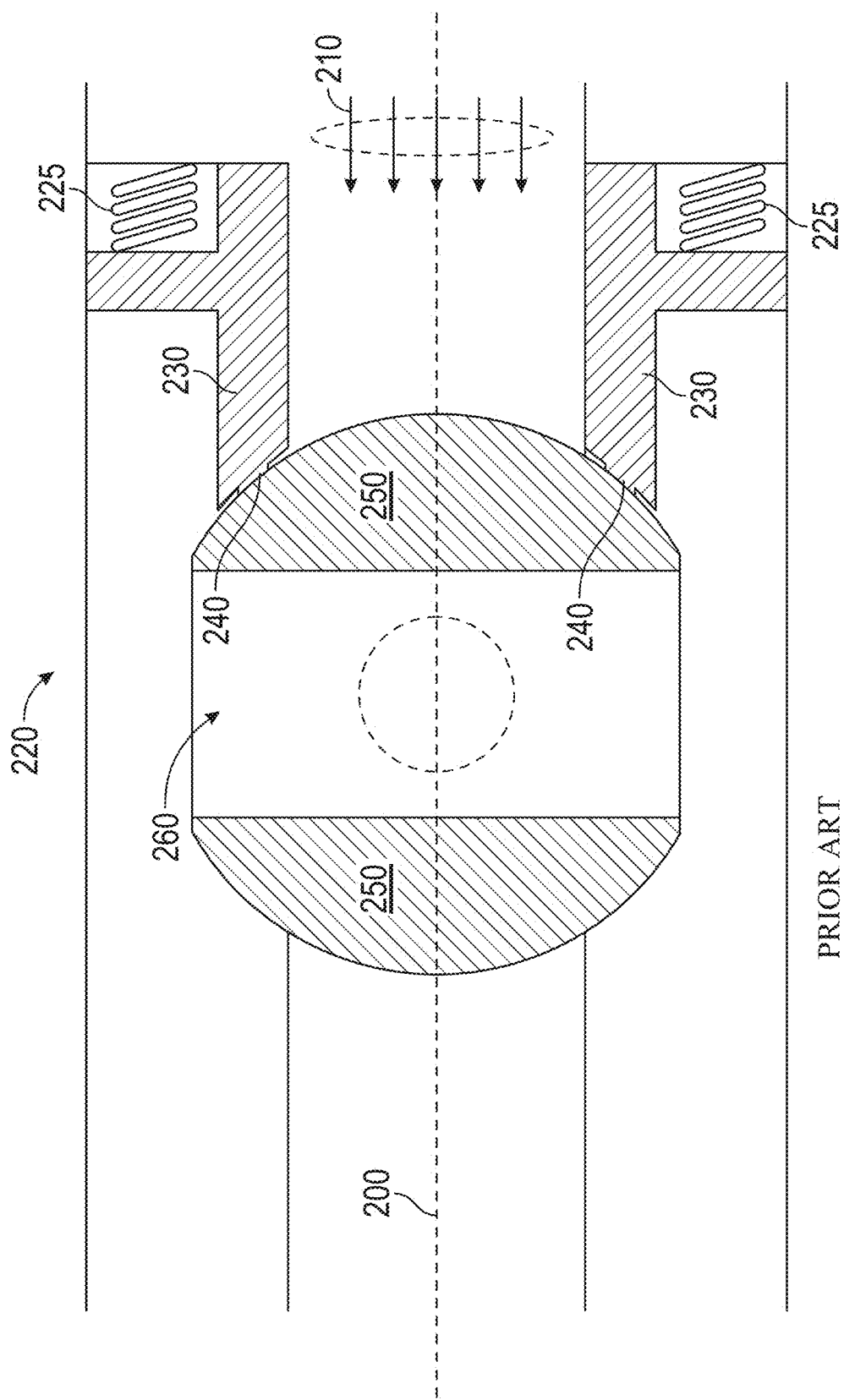
FIG. 2A illustrates a side section view of a traditional ball valve in the closed position.

FIG. 2A illustrates a side section view of a traditional ball valve 220 in the closed position. A spring 225 may be used to apply force to a piston 230 which contacts the ball 250 to provide a traditional seat 240. As shown, the spring 225 should create enough force against the traditional seat 240 to prevent the downhole fluid pressure 210 from overcoming the force in the traditional seat 240. In this position, the central bore 260 of the ball 250 is generally perpendicular to the central axis 200 of the ball valve 220.

Figure 2B:
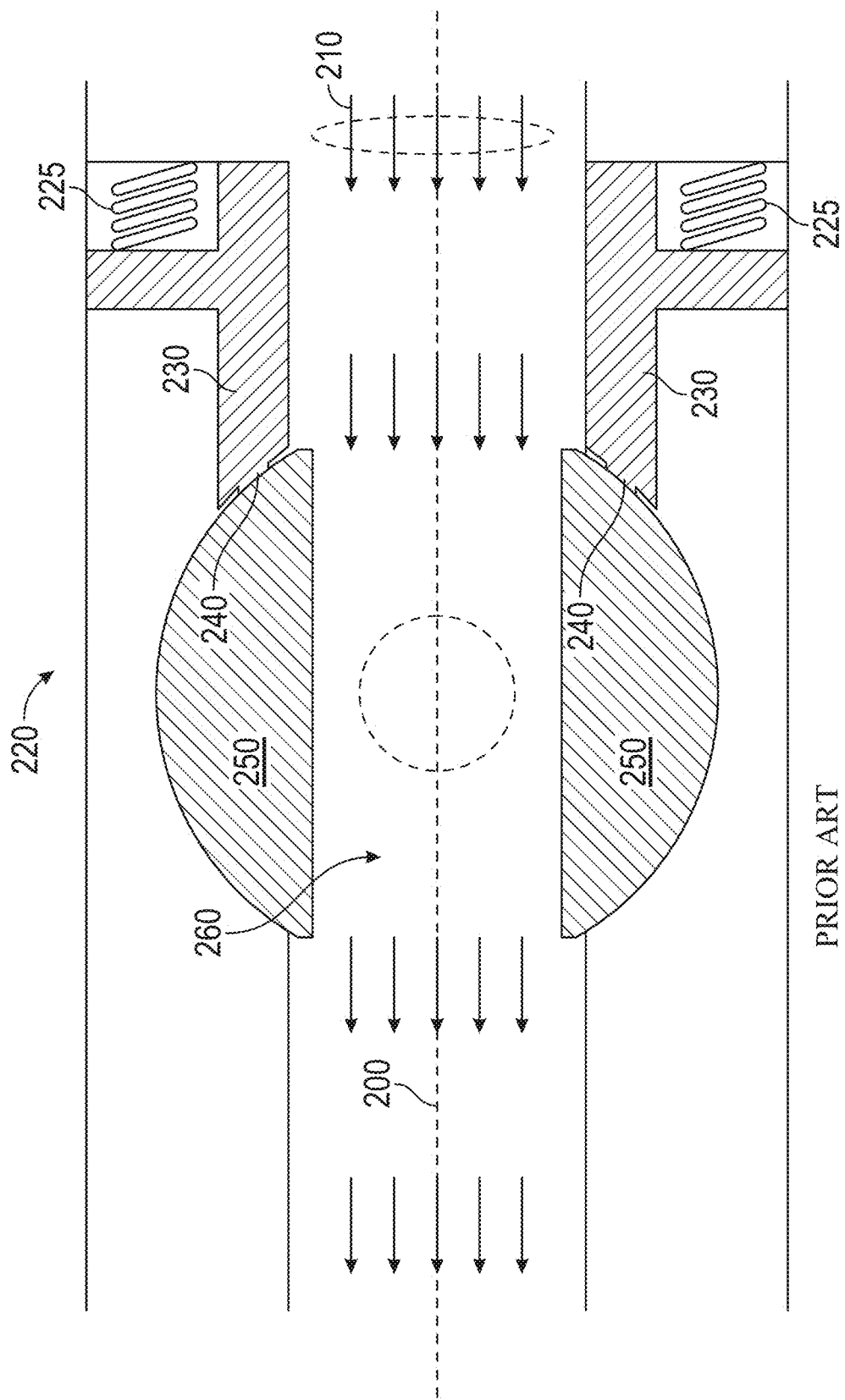
FIG. 2B illustrates a side section view of the traditional ball valve shown in FIG. 2A in the open position.

FIG. 2B illustrates a side section view of the traditional ball valve shown 220 in FIG. 2A in the open position. Here, the ball 250 has been rotated approximately 90 degrees until the central bore 260 of the ball 250 is aligned and substantially parallel to the central axis 200. Once in this position, the downhole fluid pressure 210 is permitted to create a flow of downhole fluid through the central bore 260 of the ball.

Figure 3:
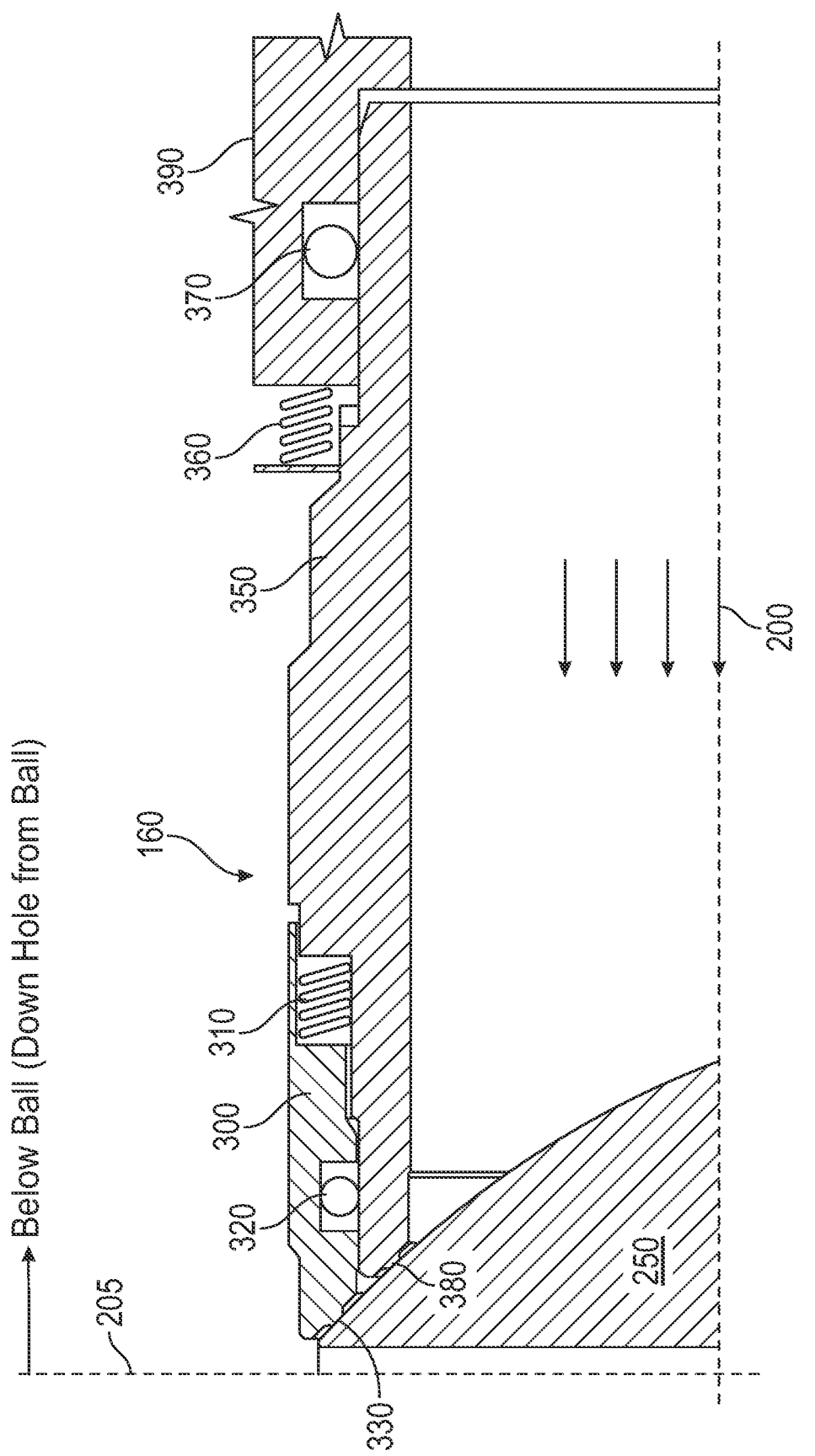
FIG. 3 illustrates a side section view of one embodiment of the gas tight ball assembly.

FIG. 3 illustrates a side section view of one embodiment of the ball valve assembly 160. In this embodiment, an external piston 300 rides atop an internal piston 350, where an external spring 310 may be placed between a flat surface of the external piston 300 and a flat surface of the internal piston 350. In some embodiments, the fluid pressure from above hole fluid and or the spring force from the external spring 310 may force the external piston 300 to the left and into contact with the surface of the ball 250 at the external seat 330. An external gasket 320 is preferably placed to provide a fluid seal between the external piston 300 and the internal piston 350. The external gasket 320 may also be positioned between the external seat 330 and the external spring 310.

The internal piston 350 may be substantially longer than the external piston 300, in some embodiments the internal piston 350 may be 3×-6× longer than the external piston 300. In some embodiments, an internal spring 360 is positioned between a flat surface on the internal piston 350 and a flat surface on the stationary body 390.

In some embodiments, the fluid pressure from above hole fluid, the spring force from the internal spring 360, and/or the fluid pressure from the down hole fluid may force the internal piston 350 to the left and into contact with the surface of the ball 250 at the internal seat 380. An internal gasket 370 is preferably placed between the internal piston 350 and the stationary body 390 to provide a fluid seal between the internal piston 350 and the stationary body 390. The internal gasket 370 is preferably placed near the far end of the internal piston 350 (i.e. furthest end away from the internal seat 380). In some embodiments the internal spring 360 is placed between the internal gasket 370 and the external spring 310. In some embodiments, the external spring 310 is placed between the external gasket 320 and the internal spring 360. Preferably the external gasket 320 is placed near a first end (i.e. closest to the ball 250) of the internal piston 350 while the internal gasket 370 is placed near a second end (i.e. furthest away from the ball 250) of the internal piston 350. In some embodiments, the external gasket 320 has a greater sealing diameter than the internal gasket 370, creating a net piston effect on the internal seat when pressure is from up hole.

The horizontal central axis 205 is shown passing through the center of the ball 250 to define components that are up hole of the axis 205 to be positioned above ball (up hole from the ball) and components that are down hole of the axis 205 to be positioned below ball (down hole from ball). The ball (shown in detail below) can also be said to have an up hole side with an opposing down hole side.

Figure 4A:
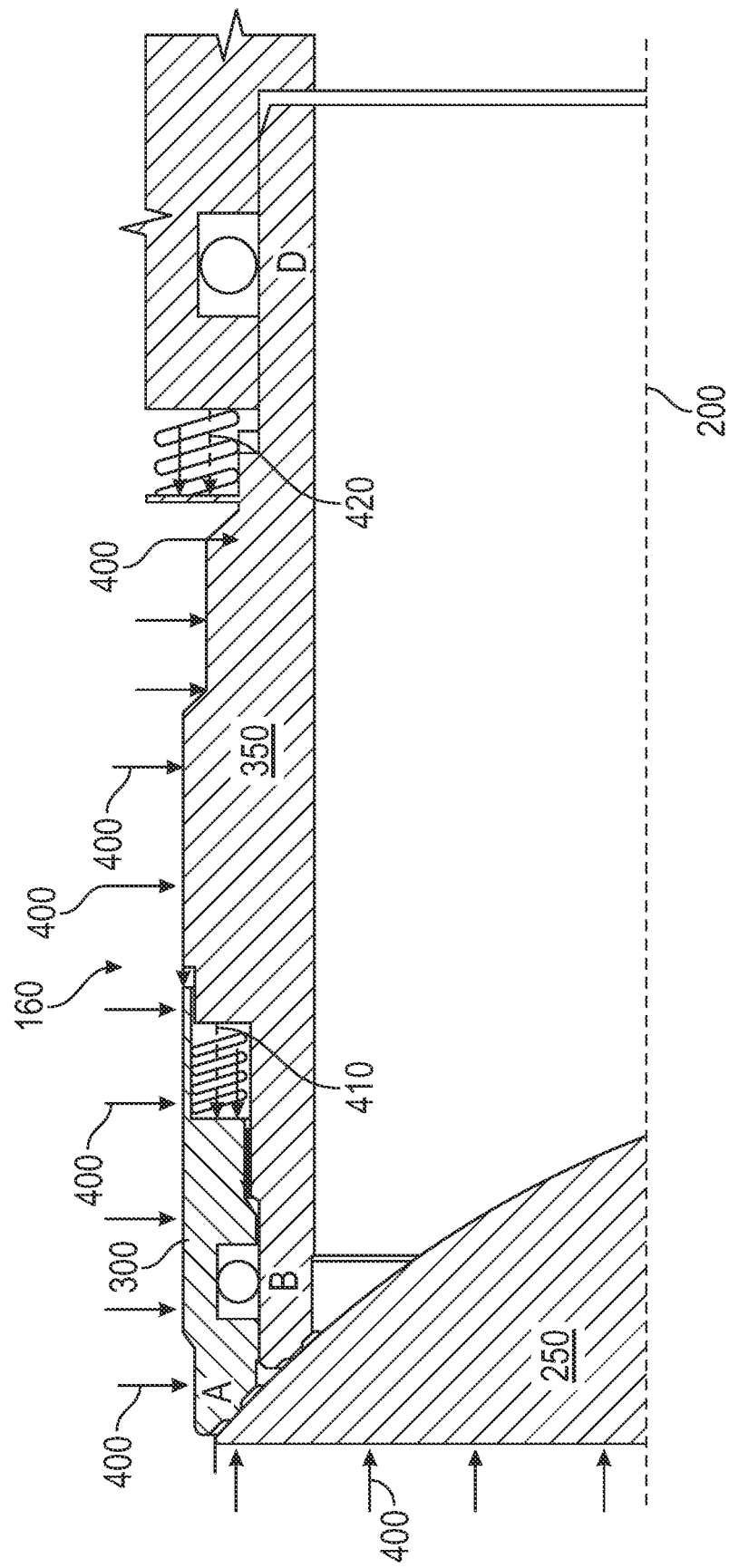
FIG. 4A illustrates a fluid pressure profile of one embodiment of the gas tight ball assembly when sealing fluid pressure from above.

FIG. 4A illustrates a fluid pressure profile of one embodiment of the ball valve assembly 160 when sealing fluid pressure from above. The above hole fluid pressure 400 is shown evenly distributed across the ball 250, the external piston 300, and the external side of the internal piston 350. The external spring force 410 is shown acting to the left on the external piston 300 while the internal spring force 420 is shown acting to the left on the internal piston 350. In some embodiments, the external spring force 410 may be approximately 300 lbf but other embodiments may have the external spring force 410 between 150 lbf and 500 lbf, depending on the application. In some embodiments, the internal spring force 420 may be approximately 1,500 lbf but other embodiments may have the external spring force 410 between 1,000 lbf and 3,000 lbf, depending on the application. In some embodiments, the internal spring force 420 is greater than the external spring force 410 and may be two to three times greater in some embodiments.

Figure 4B:
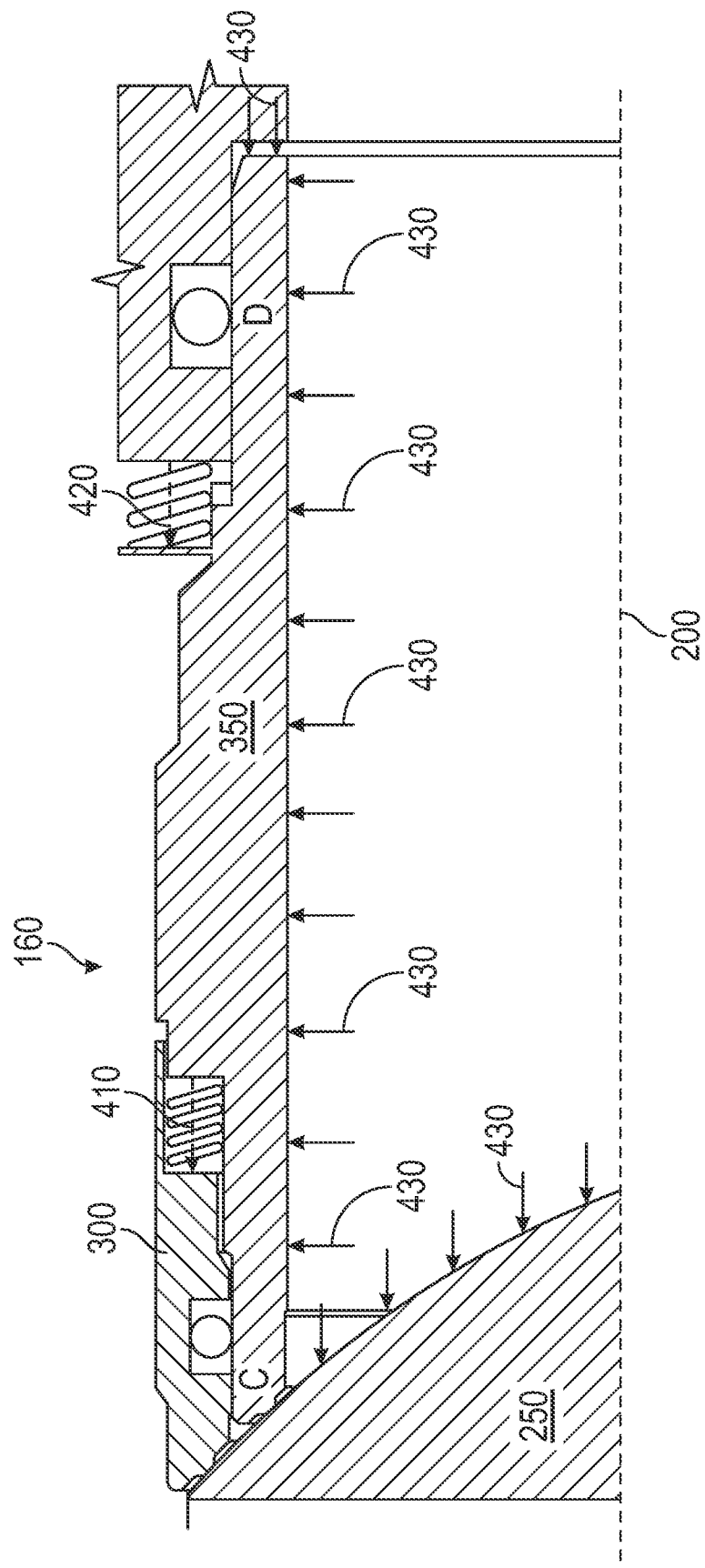
FIG. 4B illustrates a fluid pressure profile of one embodiment of the gas tight ball assembly when sealing fluid pressure from below.

Points A through D are shown in FIGS. 4A-4B to help explain the fluid pressure profile and advantages of the exemplary embodiments herein at handling these high and low pressures. Point A represents the location of the external seat 330 (where the external piston 300 makes contact with the ball 250). Point B represents the location of the external gasket 320. Point C represents the location of the internal seat 380 (where the internal piston 350 makes contact with the ball 250. Point D represents the location of the internal gasket 370.

In this application, the above hole fluid pressure 400 may be distributed across the external piston 300 from points A to B. In addition, the above hole fluid pressure will also act on the outside of the internal piston from point B to point D. Depending on the relationship between the diameters at points B & D of the internal piston will determine the direction of movement of the internal piston as a result of the above hole fluid pressure. The combined above hole fluid pressure 400 acting on these surfaces may force the external piston 300 to the left. The external spring force 410 may act to keep the external seat in contact with the ball 250 when the above ball pressure is low or near zero.

The internal spring force 420 may act to keep the internal seat in contact with the ball when the above ball or below ball pressure is low or near zero. In certain embodiments, when diameter B>D, the combined above hole fluid pressure 400 acting on these surfaces may force the internal piston 350 to the left ensuring the internal seat is always in contact with the ball regardless of the above or below ball pressure.

Generally speaking, the maximum above hole fluid pressure 400 may be in the range of 5,000 psi-10,000 psi and this excludes the effects of hydrostatic pressure. During operation and in practice the pressure across the ball could be anywhere between zero and the maximum pressure, so the embodiments herein are able to accommodate these changes in pressure (from zero all the way to the maximum pressure and then back to zero again) without causing vapor leakage at the seat or using extreme forces at the ball which could deform the ball and permit vapor leakage.

FIG. 4B illustrates a fluid pressure profile of one embodiment of the gas tight ball assembly when sealing fluid pressure from below the ball 250. The downhole fluid pressure 430 is shown evenly distributed across the ball 250 and the internal side of the internal piston 350. The external spring force 410 is again shown acting to the left on the external piston 300 while the internal spring force 420 is again shown acting to the left on the internal piston 350. In this application, the downhole fluid pressure 430 may be distributed across the internal side of the internal piston 350 from point C to D. The combined downhole fluid pressure 430 acting on these surfaces may force the internal piston 350 to the left. Again, the internal spring force 420 may act to keep the internal seat in contact with the ball when the above ball or below ball pressure is low or near zero.

Note however that the external piston 300 does not receive any forces from the downhole fluid pressure 430 such that the only force acting on the external piston is the external spring force 410.

Note that the external piston 300 contacts the ball 250 at a point near the edge of the ball 250 (i.e. away from the central axis 200) while the internal piston 350 contacts the ball 250 at a point closer to the center of the ball (i.e. closer to the central axis 200). It has been discovered that the edge of the ball 250 is more subject to deformation from high forces needed to generate sufficient contact pressure at the external seat 330, where excess deformation can create a fluid leak in the external seat 330. However, it has been discovered that when sealing pressure from below the ball, the deformation of the ball is less when the sealing forces can be applied closer to the central axis 200 of the ball 250 resulting in an improved metal to metal seal between the ball and the internal seat. In a downhole barrier valve application, the sealing performance below the ball is more important than from above the ball and so to be able to focus the below ball sealing performance over that of the above ball performance can be valuable and important. Thus, in some of the embodiments herein, the higher forces are applied to the internal seat 380 by the internal piston 350, rather than applying the higher forces to the external seat 330 by the external piston 300, which can be more prone to deformation of the surface of the ball 250.

Generally speaking, the maximum downhole fluid pressure 430 may be in the range of 5,000 psi-10,000 psi, again excluding the effects of hydrostatic pressure. But it should be noted, that the downhole fluid pressure 430 and the above hole fluid pressure 400 can vary widely during any hydrocarbon drilling and production process.

For some technical standards such as API 19V Annex F-Alternative Leakage Test, there is a requirement of zero bubbles from the below ball pressure but not necessarily required from the upside (above ball pressure). The embodiments herein are capable of satisfying the requirements of this test, including zero bubbles of gas accumulated in a graduated cylinder of the hold period (minimum of 5 minutes) after sufficient time has been allowed for stabilization at 1378 kPa (200 psi), and at 100% of the rated closing mechanism pressure. The embodiments allow adjustments to the valve assembly to ensure the internal seat performs with zero gas leakage while the external seat is not affected.

Accordingly, the present disclosure may provide ball valve assemblies for use in well systems. The methods and systems may include any of the various features disclosed herein, including one or more of the following statements.

Embodiment 1. A ball valve assembly comprising: a ball; an external piston that is biased against the ball to create an external seat on a down hole side of the ball; an internal piston that is biased against the ball to create an internal seat on a down hole side of the ball; an external gasket that seals between the external piston and the internal piston; and an internal gasket that seals between the internal piston and a stationary body.

Embodiment 2. The ball valve assembly of Embodiment 1 wherein: the internal piston is biased with a spring having at least twice of spring force as a spring used to bias the external piston.

Embodiment 3. The ball valve assembly of Embodiment 1 or Embodiment 2 wherein: the biasing of the external piston is done by a spring that is positioned between the external piston and the internal piston.

Embodiment 4. The ball valve assembly of any preceding Embodiment wherein: the internal seat is closer to a central axis of the valve assembly than the external seat.

Embodiment 5. The ball valve assembly of any preceding Embodiment wherein: the biasing of the internal piston is done by a spring that is positioned between the internal piston and a stationary body.

Embodiment 6. The ball valve assembly of any preceding Embodiment wherein: the external piston moves relative to the internal piston.

Embodiment 7. A ball valve assembly comprising: a ball having a surface and a central axis; an external piston which contacts the surface of the ball to create an external seat; an internal piston which contacts the surface of the ball to create an internal seat; an external spring positioned between the internal piston and the external piston; and an internal spring positioned between a stationary body and the internal piston.

Embodiment 8. The ball valve assembly of Embodiment 7 wherein: the internal piston is positioned between the external piston and the central axis.

Embodiment 9. The ball valve assembly of any preceding Embodiment 7 or Embodiment 8 wherein: the internal seat is positioned between the external seat and the central axis.

Embodiment 10. The ball valve assembly of any one of Embodiments 7 to 9 further comprising: an external gasket positioned between the external spring and the external seat.

Embodiment 11. The ball valve assembly of any one of Embodiments 7 to 10 wherein: when sealing off downhole fluid pressure downhole fluids contact an internal side of the internal piston.

Embodiment 12. The ball valve assembly of any one of Embodiments 7 to 11 wherein: when sealing off above hole fluid pressure above hole fluids contact an external side of the internal piston.

Embodiment 13. The ball valve assembly of any one of Embodiments 7 to 12 further comprising: an external gasket that seals between the external piston and the internal piston; and an internal gasket that seals between the internal piston and a stationary body.

Embodiment 14. The ball valve assembly of any one of Embodiments 7 to 13 wherein: the external gasket has a greater sealing diameter than the internal gasket.

Embodiment 15. A ball valve assembly comprising: a ball having a surface and a central axis; an internal piston which contacts the surface of the ball to create an internal seat, where the internal piston is located between the ball and a stationary body; an external piston which contacts the surface of the ball to create an external seat; an external spring positioned between the internal piston and the external piston; an internal spring positioned between the stationary body and the internal piston; and an internal gasket that seals between the internal piston and the stationary body.

Embodiment 16. The ball valve assembly of Embodiment 15 further comprising: a first flat surface on the external piston; a second flat surface on the internal piston which faces the first flat surface; and wherein the external spring is located between the first flat surface and the second flat surface.

Embodiment 17. The ball valve assembly of Embodiment 15 or Embodiment 16 further comprising: a third flat surface on the internal piston; a fourth flat surface on the stationary body which faces the third flat surface; and wherein the internal spring is located between the third flat surface and the fourth flat surface.

Embodiment 18. The ball valve assembly of any one of Embodiments 15 to 17 wherein: wherein external spring force is an only mechanical force acting on the external piston when the valve is sealing off downhole fluid.

Embodiment 19. The ball valve assembly of any one of Embodiments 15 to 18 wherein: wherein downhole fluid does not contact the external piston when the valve is sealing off downhole fluid.

Embodiment 20. The ball valve assembly of any one of Embodiments 15 to 19 wherein: the internal spring produces at least twice of spring force as the external spring.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. A ball valve assembly comprising:
   a ball having a horizontal central axis passing through a center of the ball and defining a down hole side and above hole side of the ball;
   an external piston that is biased against the ball to create an external seat on the down hole side of the ball;
   an internal piston that is biased against the ball to create an internal seat on the down hole side of the ball;
   an external gasket that seals between the external piston and the internal piston; and
   an internal gasket that seals between the internal piston and a stationary body,
   wherein above hole fluid contacts the external piston to push the external seat on to the ball.

2. The ball valve assembly of claim 1 wherein:
   the internal seat is closer to a central axis of the valve assembly than the external seat.

3. The ball valve assembly of claim 1 wherein:
   the biasing of the internal piston is done by a spring that is positioned between the internal piston and the stationary body.

4. The ball valve assembly of claim 1 wherein:
   the external piston moves relative to the internal piston.

5. The ball valve assembly of claim 1 wherein:
   the external seat seals fluid pressure from above the ball.

6. The ball valve assembly of claim 5 wherein:
   the internal seat seals pressure from below the ball.

7. A ball valve assembly comprising:

a ball having a surface and a horizontal central axis passing through a center of the ball and defining a down hole side and above hole side of the ball;

an external piston which contacts the surface of the ball using fluid pressure from above hole fluid to create an external seat when sealing fluid pressure from above;

an internal piston which contacts the surface of the ball to create an internal seat;

an external spring positioned between the internal piston and the external piston; and an internal spring positioned between a stationary body and the internal piston.

8. The ball valve assembly of claim 7 wherein:
the internal piston is positioned between the external piston and a central axis of the valve assembly.

9. The ball valve assembly of claim 7 wherein:
the internal seat is positioned between the external seat and a central axis of the valve assembly.

10. The ball valve assembly of claim 7 further comprising:
an external gasket positioned between the external spring and the external seat.

11. The ball valve assembly of claim 7 wherein:
when sealing off downhole fluid pressure downhole fluids contact an internal side of the internal piston.

12. The ball valve assembly of claim 7 wherein:
when sealing off above hole fluid pressure above hole fluids contact an external side of the internal piston.

13. The ball valve assembly of claim 7 further comprising:
an external gasket that seals between the external piston and the internal piston; and
an internal gasket that seals between the internal piston and the stationary body.

14. The ball valve assembly of claim 13 wherein:
the external gasket has a greater sealing diameter than the internal gasket.

15. A ball valve assembly comprising:
a ball having a surface and a horizontal central axis passing through a center of the ball and defining a down hole side and above hole side of the ball;

an internal piston which contacts the surface of the ball to create an internal seat, where the internal piston has an external side which contacts above hole fluid when the ball is oriented in a closed position;

an external piston which contacts the surface of the ball to create an external seat;

an external spring positioned between the internal piston and the external piston;

an internal spring positioned between a stationary body and the internal piston; and an internal gasket that seals between the internal piston and the stationary body.

16. The ball valve assembly of claim 15 further comprising:
a first flat surface on the external piston;
a second flat surface on the internal piston which faces the first flat surface; and
wherein the external spring is located between the first flat surface and the second flat surface.

17. The ball valve assembly of claim 15 further comprising:
a third flat surface on the internal piston;
a fourth flat surface on the stationary body which faces the third flat surface; and
wherein the internal spring is located between the third flat surface and the fourth flat surface.

18. The ball valve assembly of claim 15 wherein:
wherein external spring force is an only mechanical force acting on the external piston when the valve is sealing off downhole fluid.

19. The ball valve assembly of claim 15 wherein:
wherein downhole fluid does not contact the external piston when the valve is sealing off downhole fluid.

20. The ball valve assembly of claim 15 wherein:
the internal spring produces at least twice of spring force as the external spring.

* * * * *